United States Patent Office 2,729,426
Patented Jan. 3, 1956

2,729,426

METHOD OF DRILLING

Julian C. Smith, Ithaca, N. Y., assignor to Hough Soils Engineering Laboratories, Ithaca, N. Y., a proprietorship No Drawing. Application October 18, 1954, Serial No. 463,045

9 Claims. (Cl. 255—1.8)

This invention relates to the rotary drilling of holes or wells into the earth and more particularly to the pneumatic rotary drilling of oil and gas wells by utilizing a novel method and a novel drilling fluid for the rotary drilling of such wells. It is to be understood, however, that this invention is not necessarily limited to the drilling of oil and gas wells, but is applicable to other earth drilling operations. The term "wells" is used herein in a generic sense to include all holes drilled into the earth.

An object of this invention is to provide a drilling fluid and a method of pneumatic rotary drilling that eliminates or minimizes some or all of the difficulties encountered presently in the pneumatic rotary drilling of oil and gas wells. Another object is to provide a method of pneumatic rotary drilling that results in an increased rate of penetration, a cleaner hole bottom, an increase in bit-life and an elimination in a large degree of the agglomeration of mudcakes—made up of wet fine cuttings with or without other earth particles—which "ball-up" the bit and accumulate at times on the drill-pipe and on the walls of the hole in prior rotary drilling methods, to such an extent as substantially to cushion the drilling action of the bit and to plug the tubing and/or annular hole about the drill-pipe, which plugging cuts down the circulation of the drilling fluids entirely or to an extent that the circulating drilling fluid is unable to carry the coarser cuttings from out the hole, permitting their settling to the bottom of the well.

In the rotary drilling of oil and gas wells, it is the general practice to employ a vertically disposed drill-pipe, weighted and rotated at its upper end and carrying at its lower end a bit or cutter for penetrating the earth and thus to dig the desired hole or well. The earth structure through which the drill penetrates is commonly called in the well-drilling industry the "formation," since the earth through which the well is drilled normally forms the wall of the well, until a permanent casing is installed.

Normally, the bit or drill cuts into the formation a hole of larger diameter than the drill-pipe so that as the drill-pipe with the bit at its lower end penetrates downwardly into the formation an annular passage is formed between the walls of the hole and the drill-pipe. Such an arrangement provides two passageways, one inside the drill-pipe and the other an annular passageway outside the drill-pipe. Either one of these two passageways may be used for conducting the so-called "drilling fluid" under pressure from the "rig" at the surface down to the bit, while the other passageway serves for conducting the drilling fluid with its entrained cuttings from the bit to the surface, where the drilling fluid and the cuttings are discharged.

The general practice in rotary well drilling is to use as a drilling fluid a slurry of water and earth, preferably clay. This slurry is called in the mining industry "mud." Although such operations are costly and unsatisfactory in many respects, the use of a mud drilling fluid is generally recognized to be the practical medium for rotary well-drilling operations. See Rotary Drilling Handbook by J. E. Brantly (fifth edition) published by Palmer Publications (1952) at page 236 et seq.

It has been heretofore proposed to use a gaseous medium as a drilling fluid, such as natural gas under pressure in the drilling of gas wells, and compressed air in the drilling of oil and other wells. However, these drilling fluids have not proved to be practical and have not gone into commercial use. The use of compressed air and compressed natural gas in the experimental drilling of oil and gas wells, referred to herein as pneumatic rotary drilling, indicates performance improvements as long as the holes remain dry and the cuttings do not stick to each other so as to "ball-up" the bit or plug the hole. If, however, water-producing formation is encountered, the cuttings are wetted and become gummy and stick together, clog the bit and pack on the walls of the hole, at times completely plugging the hole. As long as no water-producing formations are encountered and the cuttings do not agglomerate, the pneumatic rotary drilling results are reported to be superior when compared to the commercial rotary drilling utilizing a mud drilling fluid.

It is, however, impossible to predict in advance that the formation through which the well is to be drilled will be free from water, or that the cuttings will not stick to each other and pack to form mud cakes which close off the outlet passageway from the bottom of the wall to the surface. Quite to the contrary, it is almost certain that at some depth there will be water in the formation or the cuttings will stick to each other, and that the water and agglomeration of cuttings will prevent the effective use of pneumatic rotary drilling where gas or air alone is used as the drilling fluid. As a consequence, pneumatic rotary drilling has heretofore been considered to be impractical for commercial operations.

The present invention is based on a discovery of novel drilling method and a novel drilling fluid which when used in pneumatic rotary drilling operations are capable of overcoming the difficulties heretofore encountered in pneumatic rotary drilling with compressed natural gas and with compressed air as the drilling fluid. Broadly, this novel drilling fluid comprises a gaseous medium through which is dispersed in fine particle size a hydrophobic powder, having a high surface area and a good coating capacity. The gaseous medium may be air or natural gas or other truly gaseous media and the hydrophobic powder may be any one of a number of such very finely divided hydrophobic powders.

The hydrophobic powders which I have found to be effective as constituents of the novel drilling fluids of this application comprise finely divided solids of high surface areas, such as 1 to 1000 square meters per gram, the ultimate particles of which are for the most part about 5 to 250 millimicrons in size, and which finely divided solid particles have at least a surface layer of hydrophobic water-repelling ions or chemical radicals to a depth that the topochemical properties of the surfaces of the particles are essentially hydrophobic.

Finely divided solids of high surface areas and particle sizes of the order above indicated, when chemically treated to give to at least the surface layers of the particles hydrophobic properties, have been found in actual operations, when constituting a constituent of the novel drilling fluid of this application, to impart to the drilling fluid an outstanding effectiveness in the drilling of wells through water-containing formations.

Thus, when finely divided siliceous solids having high surface areas and small particle sizes of the order above enumerated, which have active hydroxy groups on the surfaces of the particles, are esterified with a primary or secondary monohydric alcohol of the formula R—O—H, R being a hydrocarbon radical of at least two carbon atoms wherein the carbon atom attached to the oxygen atom is also attached to hydrogen, there are produced finely divided powders which are definitely hydrophobic and which are satisfactory for the purposes of this invention.

In certain cases, it may be necessary or desirable to activate the surfaces of the finely divided solid particles, before esterification, by washing the particles with acid to build up on the surfaces of the particles layers of hydroxy groups which, when esterified, produce at least surface layers of alkoxy groups having the hydrophobic characteristics above described, and thus at least surface layers on the finely divided solids or powder, which are hydrophobic and water repellent. For example, the surfaces of finely divided siliceous particles, such as silicia or metal silicates, may be reacted with acids to build up on the surfaces of the siliceous particles surface layers of silanol and/or hydroxy groups, and then these groups chemically converted, as, by esterification, to alkoxy groups of the R—O—H formula above defined, which imparts to the individual powder particles hydrophobic surfaces.

For convenience, all of the above described finely divided solids of the high surface area and small particle size of the order mentioned above which have at least their topochemical surfaces possessing hydrophobic properties are sometimes herein generically referred to as "hydrophobed surfaced powders."

In one embodiment of this invention, the siliceous substrates, which are to be hydrophobed surfaced, comprise not only finely divided amorphous silica but also any finely divided product which has at least a surface of silica, that is, a surface layer to a depth that the topochemical properties of the substrate are essentially those of amorphous pure silica on a core of another material.

One of the preferred forms of the hydrophobed surfaced powder of this application is surface-esterified precipitated amorphous silica, having particles of high surface areas, such as 1 to 1000 m²/g., and an average ultimate particle size for the most part of from around 5 to 250 millimicrons, although finer or coarser particle sizes may be employed. Thus, a commercial hydrophobic silica marked as "Dupont Fine Silica" having a surface area of about 275 to 325 m²/g. and an average particle size of about 8 to 10 millimicrons, as well as "GS Hydrophobic Silica" marketed by DuPont having a surface area of from about 250 to 300 m²/g. and an ultimate particle size of around 8 to 10 millimicrons, are illustrative. In the commercial product, the ultimate particles are sometimes agglomerated into units of from 1 to 10 microns in size. Such powders may be used in the novel drilling fluid, since they are broken down during use, but it is preferable to micronize the agglomerates to secure a powder of fine particle size. In any event, the hydrophobed surfaced powder should be in the form which will readily cover the surfaces of the fine cuttings made during well drilling to render them water-repellent.

Another substrate suitable for esterification to form another type of hydrophobed surfaced silica consists of particles having an exterior coating or layer of amorphous silica upon a core of another material. These substrates may be made by depositing active silica upon nuclei of finely divided solid core materials by treating sodium silicate with an acid in the presence of the core materials. Colloidal clays, glass fibers, titania pigments and the like may serve as cores, the ultimate coated particles being of the high surface areas and small particle size above described.

Another substrate is the hydrated amorphous silica powder described in Chemical Engineering 54, No. 12, 177 (1947) produced by the Linde Air Products Company. A further form of amorphous silica is an aerogel having a specific surface area of about 160 m²/g. as determined by nitrogen absorption and a bulk density of about 0.087 g. per cc. at 3 p. s. i. g. and marketed as "Santocel C." Still another form of amorphous silica substrate is a powder consisting of aggregates having an average diameter of about 25 millimicrons, a surface area of about 100 m²/g. and marketed as "Hi Sil."

Yet another substrate is formed from metal silicate having large proportions of metal ions on the surface which is activated for esterification by washing with acid to remove the surface metal ions and leave in place thereof silanol groups. Thus, a precipitated hydrated calcium silicate, having a molecular ratio of $SiO_2CaO$ equal to about 3.25 containing particles of the order of 30 to 50 millimicrons and marketed as "Silene E F" and described in Chemical & Engineering News 24, 3147 (1946) is within the scope of the silica substrates capable of being esterified to produce hydrophobed surfaced silica, or water-repellent dusting powder, of this invention.

Esterification of the finely divided solids in particle form of the order above mentioned may be carried out in any of the well known ways. For example, esterification may be carried out by chemically reacting a monohydric alcohol with a siliceous surfaced substrate of the nature outlined above. Preferably the substrate should be in the form of a finely divided solid having an extensive surface area of the order described above, and the alcohol of the formula R—O—H, in which R is a hydrocarbon radical having at least two carbon atoms wherein the carbon attached to oxygen is also attached to hydrogen. Alcohols where R represents a hydrocarbon radical having 2 to 20 carbon atoms have been found to be within the preferable range. To obtain an esterified hydrophobed surfaced silica having high water repellent properties, the esterification should preferably be carried out in a liquid system containing at all times a low percent by weight of water. Thus, 2% to 5% of water by weight of the alcohol in the system yields a hydrophobed surfaced silica of high water-repelling properties. With n-butyl alcohol and pure amorphous silica powder having a particle form of the character referred to above reacted in a liquid system of alcohol and water, in which the water is 2% by weight of the alcohol, an excellent hydrophobed surfaced silica powder is formed, which has been found very effective in the process of this invention. The hydrophobed surfaced silicas produced as described in the U. S. Patent No. 2,657,149 are illustrative of the hydrophobed surfaced powders of this application.

To produce the novel drilling fluid of this application a hydrophobed surfaced dusting powder such as is above described is admixed with the gas to be used in the pneumatic rotary drilling process as the drilling fluid. The hydrophobed surfaced dusting powder may be added to the gas either before or after it has been compressed. Depending on the depth of the well at any point, the pressure of the gaseous medium ranges from 100 to 1000 p. s. i. at time of admission to the drill-pipe. The hydrophobed surfaced powder is normally added to and dispersed throughout the gaseous medium of the drilling fluid in about 5 pounds of the dusting powder to one pound of the gaseous medium, although a less or greater amount of the hydrophobed surfaced powder may be added to form the novel drilling fluid of this invention, since proportions are not critical.

The admixture comprising a gas and a hydrohobed surfaced powder disseminated therethrough constitutes a preferred form of the drilling fluid of this application. The drilling fluid passes down the drill-pipe to the bit, where it escapes through the bit and through jets directed to the bottom of the well. The relatively fast moving drilling fluid expands in turbulent currents in passing from the drill-pipe through and around the bit and in intimate contact with the cuttings as they are made by the bit, and thence to the annular passage surrounding the drill-pipe and in so doing the expanding turbulent gas cools the bit, clears the bottom of the well of cuttings and what is of prime importance in this invention coats the surfaces of the fine cuttings practically as soon as made with the hydrophobed surfaced silica powder which imparts to the cuttings the high water-repellent characteristics of the hydrophobed surfaced powder. Water entering from the formation mixes with the circulating drilling fluid and water-repellent coated cuttings and consequently does not wet the cuttings which remain discrete and are carried up out of the well by the up-flow of the circulating drilling fluid. Since the fine cuttings thus treated with the water-repellent hydrophobed surfaced powder are not wetted by water within the well, they do not stick together to form cakes or agglomerates either to ball-up the bit or to form mud-cakes on the drill-pipe or walls of the formation, but the cuttings are carried away up out of the well in discrete particle form along with the up-circulation of the water-repellent dusting-powder-loaded drilling fluid. Such a drilling fluid comprising a gaseous medium and a hydrophobed surfaced dusting powder enables the pneumatic rotary drilling to be continuous and not interrupted by agglomerated cuttings as is the case with prior pneumatic drilling methods, removes the chips or cuttings from the bit faster, maintains a cleaner hole bottom, cools more effectively the bit and permits a greater friction or bite between the cutter teeth and the formation, and thus makes possible a more rapid penetration of the bit into the formation. The method of drilling of this application is faster, surer and cheaper.

While in the above description the drilling fluid passes down through the drill-pipe and up through the annular space between the drill-pipe and the well wall, it is to be understood that reverse circulation of the drilling fluid down through the annular passage and up through the drill-pipe may under certain circumstances be preferred.

In one example of the operations of the invention of this application, in which a well was drilled through a water-containing formation, compressed air under about 800 lbs. p. s. i. pressure was admitted to the upper end of the drill-pipe of a conventional rotary drilling rig and concurrently therewith there was injected into the air as it entered the drill-pipe a hydrophobed surfaced amorphous silica in fine particle form of the order above described having high water-repellent and high surface covering properties, in the proportions of about 5 pounds of hydrophobed surfaced silicia to one pound of air. The well was completed without any balling-up of the bit or plugging of the hole; the bottom of the hole was kept clean as was evidenced by the faster penetration of the bit without interruption and the longer life of the bits used. As compared with present commercial operations, the drilling was completed in a much shorter time and much more economically.

This intimate admixture of air and powder comprising finely divided hydrophobed surfaced amorphous silica, constitutes one embodiment of the novel drilling fluid of this application. The amount of hydrophobed surfaced silica powder is not critical. While it is possible to produce a freely flowable drilling fluid with as high as 50 pounds of the finely divided solids to one pound of air, experience has shown considerably lower loadings are desirable in the drilling fluids of this application. Although higher and lower loadings may be used, up to 25 pounds of the hydrophobed surfaced dusting powder to one pound of air are within a workable range, with a preferable range of from 1 to 10 pounds of the hydrophobed surfaced powder to one pound of air meeting most requirements. It is to be understood, however, that the drilling fluid of this application may comprise any proportions of its constituents that produce a freely flowable medium capable of coating of the cuttings with a surface coating of the hydrophobed surfaced powder and for conveying the cuttings up out of the well. Experience to date has shown that the finely divided hydrophobed surfaced silica in the proportions of 0.5% to 10% of the weight of the cuttings being made by the penetration of the bit into the well formation give good results, and for economical reasons the use of such small amounts is dictated. However, where considerable water is encountered in the formation, higher percentages are desirable and are determined by the condition of the drilling fluid and cuttings discharged from the well.

It is not necessary for the very coarse cuttings to be coated with the hydrophobed surfaced powder, since if large chips do become wet they are still readily carried up out of the well by the circulating stream of the novel drilling fluid of this invention. It is the fine cuttings that, when wet, "glue" the cuttings to each other to "ball-up" the bit and "plug up" the circulatory passageways, which need be kept in discrete form. It is consequently sufficient for the purposes of this invention that the hydrophobed surfaced powder surface-coat the fine cuttings. Fortunately, the hydrophobed surfaced powders of this application, having high surface areas and small particle sizes of the order hereinabove described, are preferentially attracted to the fine cuttings, which have relatively very much more surface area on which the hydrophobed surfaced powders can be deposited, the surface forces of attraction being much greater on fine cuttings than on coarse chips. This statement of facts is here made to indicate that while the novel drilling fluid of this application may contain a sufficiently high proportion of hydrophobed surfaced dusting powder to surface-coat all cuttings, satisfactory results may be obtained, and more economically, with lower proportions of the dusting powder so long as there is a sufficient amount to surface-coat the fine cuttings sufficiently to prevent an agglomeration or gluing together of the cuttings.

It will be appreciated that it is necessary to render the cuttings water repellent only for a period of time sufficient for the circulating drilling fluid to carry the hydrophobed cuttings up out of the well, commonly less than 30 seconds and under severe conditions not more than two minutes, and that consequently lower proportions of the hydrophobed surfaced powder may be added to the circulating air stream during the earlier stages of drilling when the well is less deep than at later stages when the well is of greater depth. However, since the operation of the circulating drilling fluid is not adversely affected by an excess of hydrophobed surfaced powder, the tendency in practical operations seems to be to use a wide factor of safety in the proportion of hydrophobed surfaced powder to weight of cuttings. The range of 0.5% to 10% of hydrophobed surfaced silica to the weight of cuttings being discharged is normally employed, but this invention is in nowise limited to any proportions of the hydrophobed surfaced powder to the gaseous medium content of the drilling fluid.

It is to be understood that various modifications of the novel drilling fluid and of the novel process of pneumatic drilling set forth in the specification may be made without departing from the spirit of this invention which is limited only as defined in the appended claims.

What I claim is:

1. In a process of pneumatic drilling of wells in which a drilling fluid is circulated downwardly to the bit of the drill in one passageway and upwardly from the bit to surface discharge through another passageway, the steps which comprise producing a drilling fluid of compressed gaseous media having a hydrophobed surfaced finely divided powder disseminated therethrough, conducting the said drilling fluid under pressure down one passageway to the bit, passing the drilling fluid through and around the bit in a manner to cause the said gaseous media to expand so as to cool the bit and the said hydrophobed surfaced powder to coat the surfaces of the cuttings as they are made to render the cuttings water repellent, and then conducting the said drilling fluid with the entrained powder-coated cuttings to the surface for discharge.

2. In the process as described in claim 1 in which the gaseous medium is natural gas.

3. In the process as described in claim 1 in which the gaseous medium is air.

4. In the process as described in claim 1, in which the hydrophobed surfaced powder has a specific surface area of 1 to 1000 square meters per gram and an ultimate particle size of from about 5 to 250 millimicrons.

5. In the process as described in claim 4, in which the hydrophobed surfaced powder is a substrate having an amorphous silica surface esterified with a monohydric alcohol of the formula R—O—H, wherein R is a hydrocarbon radical having 2 to 20 carbon atoms and wherein the carbon atom attached to the oxygen is also attached to hydrogen.

6. In the process as described in claim 5, in which the hydrophobed surfaced silica powder particles are surfaced coated with —OR groups, the coating of —OR groups being chemically bound to the silica, R being a hydrocarbon radical having 2 to 20 carbon atoms and wherein the carbon atom attached to the oxygen is also attached to hydrogen.

7. In the process as described in claim 5, in which the hydrophobed surfaced silica powder particles are surfaced coated with —OR groups, the coating of —OR groups being chemically bound to the silica and R being an alkoxy radical having 4 carbon atoms.

8. In the process as described in claim 5, in which the hydrophobed surfaced silica dusting powder particles are coated with n-butoxy groups, the n-butoxy coating being chemically bound to the silica.

9. In a process of pneumatic drilling of wells in which a drilling fluid is circulated downwardly to the bit of the drill in one passageway and upwardly from the bit to surface discharge through another passageway, the steps which comprise producing a drilling fluid of compressed air having disseminated therethrough a finely divided siliceous powder of high surface area, the particles of which have been made hydrophobic by esterification of the active silanol groups on the surfaces of the siliceous particles by reacting with a monohydric alcohol to convert the hydroxy groups on the surface of the siliceous particles to water-repelling alkoxy groups, conducting said drilling fluid under pressure down one passageway to the bit and through and around the bit into the other passageway so as to coat the cuttings as they are made with a water-repellent layer of said hydrophobed surfaced siliceous particles and then conducting the said drilling fluid with the entrained cuttings to the surface for discharge.

References Cited in the file of this patent

UNITED STATES PATENTS

| | | |
|---|---|---|
| 2,469,354 | Bond | Oct. 24, 1945 |
| 2,581,943 | Dautrebande | Jan. 8, 1952 |
| 2,676,148 | Iler | Apr. 20, 1954 |
| 2,692,863 | Iler | Oct. 26, 1954 |
| 2,701,122 | Grable | Feb. 1, 1955 |
| 2,705,700 | Iler | Apr. 5, 1955 |